US012812065B2

(12) United States Patent
Wang

(10) Patent No.: US 12,812,065 B2
(45) Date of Patent: Nov. 24, 2026

(54) ENHANCED SIGNALLING OF PRESELECTION IN A MEDIA FILE

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 19/098,595

(22) Filed: Apr. 2, 2025

(65) Prior Publication Data

US 2025/0260784 A1 Aug. 14, 2025

Related U.S. Application Data

(63) Continuation of application No. PCT/US2023/034015, filed on Sep. 28, 2023.

(60) Provisional application No. 63/412,632, filed on Oct. 3, 2022.

(51) Int. Cl.
*H04N 7/01* (2006.01)
*H04N 19/70* (2014.01)

(52) U.S. Cl.
CPC ............... *H04N 7/01* (2013.01); *H04N 19/70* (2014.11)

(58) Field of Classification Search
CPC ................................. H04N 7/01; H04N 19/70
See application file for complete search history.

(56) References Cited

U.S. PATENT DOCUMENTS

| | | | | |
|---|---|---|---|---|
| 12,069,310 | B2 * | 8/2024 | Choi | H04N 19/1883 |
| 2010/0153395 | A1 | 6/2010 | Hannuksela et al. | |
| 2024/0284000 | A1 * | 8/2024 | Schreiner | H04N 21/4343 |

FOREIGN PATENT DOCUMENTS

| | | | |
|---|---|---|---|
| WO | 2020240089 | A1 | 12/2020 |
| WO | 2022135507 | A1 | 6/2022 |

OTHER PUBLICATIONS

"Text of ISO/IEC DIS 14496-12 8th edition ISO base media file format", 139. MPEG Meeting; Jul. 18, 2022-Jul. 22, 2022; Online; (Motion Picture Expert Group or ISO/IEC JTC1/SC29/WG11), No. n21780, Sep. 20, 2022 (Sep. 20, 2022), XP030304301, 327 pages.

"Potential Improvement of CDAM ISO/IEC 14496-12:2021 AMD 1 Improved brand documentation and other improvements. Y-K Wang (Bytedance):" [6.1][ISOBMFF] On preselection, 139. MPEG Meeting; Jul. 18, 2022-Jul. 22, 2022; Online; (Motion Picture Expert Group or ISO/IEC JTC1/SC29/WG11), No. m60091, Jul. 8, 2022, XP030331748, 46 pages.

Extended European Search Report from European Patent Application No. 23875398.2 dated Sep. 8, 2025, 8 pages.

"Series H: Audiovisual and Multimedia Systems Infrastructure of audiovisual services—Coding of moving video High efficiency video coding," Rec. ITU-T H.265 | ISO/IEC 23008-2 (in force edition), Apr. 2013, 317 pages.

"Series H: Audiovisual and Multimedia Systems Infrastructure of audiovisual services—Coding of moving video Versatile video coding," Recommendation ITU-T H.266 dated Aug. 2020, 516 pages.

(Continued)

*Primary Examiner* — Kyu Chae
(74) *Attorney, Agent, or Firm* — Conley Rose, P.C.

(57) ABSTRACT

A mechanism for processing video data is disclosed. The mechanism determines information from a Preselection Group Box. A segment_order field is omitted from the Preselection Group Box and sub-boxes thereof. A conversion is performed between a visual media data and the media data file based on the Preselection Group Box.

20 Claims, 6 Drawing Sheets

(56) References Cited

OTHER PUBLICATIONS

Rec. ITU-T Rec. H.274 | ISO/IEC 23002-7, "Series H: Audiovisual and Multimedia Systems Infrastructure of audiovisual services Coding of moving video Versatile supplemental enhancement information messages for coded video bitstreams," Aug. 2020, 86 pages.
ISO/IEC 14496-12: "Information technology—Coding of audio-visual objects—Part 12: ISO base media file format," Sixth edition Dec. 2020, 15 pages.
ISO/IEC 23009-1: "Information technology—Dynamic adaptive streaming over HTTP (DASH)—Part 1: Media presentation description and segment formats," ISO/IEC JTC 1/SC Jan. 5, 29, 2012, ISO/IEC 23009-1:2012(E) ISO/IEC JTC 1/SC 29/WG 11, 133 pages.
ISO/IEC 14496-15: "Information technology—Coding of audio-visual objects—Part 15: Carriage of network abstraction layer (NAL) unit structured video in the ISO base media file format, Amendment 2: Carriage of VVC in ISOBMFF," Draft Amendment ISO/IEC 14496-15:2019 DAM 2, 15 pages.
ISO/IEC 23008-12: "Information technology—High efficiency coding and media delivery in heterogeneous environments—Part 12: Image File Format," Amendment 1: Support for predictive image coding, bursts, bracketing and other inprovements, First edition Dec. 2017, Amendment 1, Nov. 2020, 12 pages.
ISO/IEC JTC 1/SC 29/WG 03 output document N0651, "Text of ISO/IEC DIS 14496-12 8th edition ISO Base Media File Format", Information technology—Coding of audio-visual objects—Part 12: ISO base media file format, Seventh edition, Jan. 2022, 15 pages.
International Search Report from PCT Application No. PCT/US2023/034015 dated Dec. 12, 2023, 10 pages.

* cited by examiner

ENHANCED SIGNALLING OF PRESELECTION IN A MEDIA FILE

CROSS-REFERENCE TO RELATED PATENT APPLICATIONS

This application is a continuation of International Patent Application No. PCT/US2023/034015, filed on Sep. 28, 2023, which claims the benefit of U.S. Provisional Patent Application No. 63/412,632, filed Oct. 3, 2022, the teachings and disclosure of which are hereby incorporated in their entireties by reference thereto.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining information from a PreselectionGroupBox, wherein a segment_order field is omitted from the PreselectionGroupBox and sub-boxes thereof; and performing a conversion between a visual media data and the media data file based on the PreselectionGroupBox.

A second aspect relates to an apparatus for processing video data comprising: a processor; and a non-transitory memory with instructions thereon, wherein the instructions upon execution by the processor, cause the processor to perform any of the preceding aspects.

A third aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to a non-transitory computer-readable recording medium storing a bitstream of a video which is generated by a method performed by a video processing apparatus, wherein the method comprises: determining information from a PreselectionGroupBox, wherein a segment_order field is omitted from the Preselection-GroupBox and sub-boxes thereof; and generating a bitstream based on the determining.

A fifth aspect relates to a method for storing bitstream of a video comprising: determining information from a PreselectionGroupBox, wherein a segment_order field is omitted from the PreselectionGroupBox and sub-boxes thereof; generating a bitstream based on the determining; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
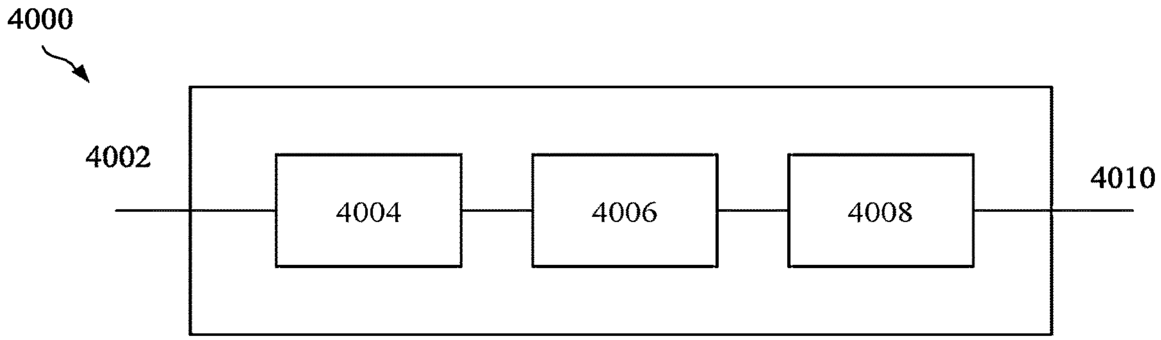
FIG. 1 is a block diagram showing an example video processing system.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by bold italics indicating cancelled text and bold underline indicating added text, with respect to a draft of the Versatile Video Coding (VVC) specification or ISO base media file format (ISOBMFF) file format specification.

1. INITIAL DISCUSSION

This document is related to media file formats. Specifically, it is related to signaling of preselection in a media file, wherein a preselection is a set of one or more tracks representing one version of the media content for simultaneous decoding or presentation. The ideas may be applied individually or in various combination, to media files according to any media file formats, e.g., the ISOBMFF and file format derived from the ISOBMFF.

2. VIDEO CODING INTRODUCTION 2.1 Video Coding Standards

Video coding standards have evolved primarily through the development of the International Telecommunication Union (ITU) telecommunication standardization sector (ITU-T) and International Organization for Standardization (ISO)/International Electrotechnical Commission (IEC) standards. The ITU-T produced H.261 and H.263, ISO/IEC produced motion picture experts group (MPEG)-1 and MPEG-4 Visual, and the two organizations jointly produced the H.262/MPEG-2 Video and H.264/MPEG-4 Advanced Video Coding (AVC) and H.265/high efficiency video coding (HEVC) [1] standards. Since H.262, the video coding standards are based on the hybrid video coding structure wherein temporal prediction plus transform coding are utilized. The Versatile Video Coding (VVC) standard (ITU-T H.266 | ISO/IEC 23090-3) [2] and the associated Versatile Supplemental Enhancement Information (VSEI) standard (ITU-T H.274 | ISO/IEC 23002-7) [3] are designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media. The Essential Video Coding (EVC) standard (ISO/IEC 23094-1) is another video coding standard that is developed by MPEG.

2.2 File Format Standards

Media streaming applications are based on the internet protocol (IP), Transmission Control Protocol (TCP), and HyperText Transfer Protocol (HTTP) transport methods, and rely on a file format such as the ISO base media file format (ISOBMFF) [4]. One such streaming system is dynamic adaptive streaming over HTTP (DASH) [5]. For using a video format with ISOBMFF and DASH, a file format specification specific to the video format, also referred to as network abstraction layer file format (NALFF) [6], which includes the file format specifications for all NAL units based video codecs such as AVC, HEVC, VVC, and their extensions, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session. Similarly, for using an image format with ISOBMFF, a file format specification specific to the image format, such as the AVC image file format and the HEVC image file format in [7], would be needed.

2.3 Preselection Signaling in the ISOBMFF

An edition of the ISOBMFF standard is being developed. A draft specification of this edition is included in [8], which includes the specification of some features for preselection signalling, as follows.

. . . .

3.1 Defections and Terms

. . . .

Preselection

Set of one or more tracks representing one version of the media presentation for simultaneous decoding or presentation.

. . . .

8.3.4.4.3 Preselection Group Box 8.3.4.4.3.1 Definition

The presence of a TrackGroupTypeBox with track_group_type equal to 'pres', which is also referred to as a PreselectionGroupBox, in a track indicates that this track contributes to a preselection.

All the tracks that have a track group with track_group_type equal to 'pres' and a particular value of track_group_id are part of the same preselection. The particular value of track_group_id is also referred to as the identifier (ID) of the preselection.

NOTE 1. This means that a preselection is uniquely identified by the track_group_id of the track group.

When multiple tracks contribute to a preselection, the optionally present PreselectionProcessingBox provides information on how to process the track containing this box in the context of the preselection and relative to other tracks. Consequently, the content of the PreselectionProcessingBox may differ for each track within a preselection.

NOTE 2. Preselections made from only one track do not require any track-related processing. In this case, the PreselectionProcessingBox is typically not present in the PreselectionGroupBox.

8.3.4.4.3.2 Syntax

```
aligned(8) class PreselectionGroupBox extends
TrackGroupTypeBox('pres')
{
  PreselectionProcessingBox preselection_processing;   // optional
}
```

8.3.4.4.3.3 Semantics preselection_processing is an instance of the PreselectionProcessingBox, providing information needed for processing the containing track in the context of the preselection.

8.3.4.4.3.4 Preselection Processing Box 8.3.4.4.3.4.1 Definition

Box Type: 'prsp'

Container: PreselectionGroupBox

Mandatory: No

Quantity: Zero or one

This box contains information about how the tracks contributing to the preselection can be processed. Media type specific boxes may be used to describe further processing.

8.3.4.4.3.4.2 Syntax

```
aligned(8) class PreselectionProcessingBox
  extends FullBox('prsp', version=0, flags ){
  unsigned int(8) track_order;
  unsigned int(1) sample_merge_flag;
  unsigned int(7) reserved;
  // further attributes and Boxes defining additional processing of
  // the track contributing to the preselection
}
```

8.3.4.4.3.4.3 Semantics track_order defines the order of this track relative to other tracks in the preselection as described below.

sample_merge_flag equal to 1 indicates that this track is enabled to be merged with another track as described below.

Sample entry specific specifications might require the tracks for a preselection to be provided to the respective decoder instances in a specific order. Since other means, such as the track_id, are not reliable for this purpose, the track_order is used to order tracks in a preselection relative to each other. A lower number indicates that at a given time the sample of the containing track is provided to the decoder before the sample with the same given of other tracks with higher number. If two tracks in a preselection have their track_order set to the same value or if the preselection processing box is absent for at least one of the tracks, the order of these tracks is not relevant for the preselection, and samples can be provided to the decoder in any order.

A merge group is defined as a group of tracks, sorted according to track_order, where one track with the sample_merge_flag set to 0 is followed by a group of consecutive tracks with the sample_merge_flag set to 1. All tracks of a merge group shall be of the same media type and shall have all samples time-aligned.

If the sample entry type is associated with a codec-specific process to merge samples of a preselection, this process shall be used.

NOTE 1. If the tracks in the merge group are all of sample entry type of "mhm2" (MPEG-H 3D Audio), the merging process is defined in ISO/IEC 23008-3:2019, subclause 14.6.

NOTE 2. Tracks in a merge group may have different sample entry types.

If the sample entry type is not associated with a codec-specific process to merge samples of a preselection, the following process shall be used:

Merging within the merge group shall proceed by forming tuples of track samples with the same time stamp across contributing tracks. The ordering of samples within the tuple shall be determined by track_order. These tuples shall be formed by byte-wise concatenation of the samples resulting in a single sample with having the respective time stamp assigned. If generation of new tracks is targeted, each merge group shall result in a separate output track conformant to a media type derived from the media types of the merged tracks.

For tracks not part of a merge group, a merging process is not specified by the present document.

8.3.5 Track Group Description Box 8.3.5.1 Definitions

Box Type: 'tkgd'

Container: MovieBox

Mandatory: No

Quantity: Zero or One

The TrackGroupDescriptionBox provides an array of TrackGroupEntryBoxes, where each TrackGroupEntryBox provides detailed characteristics of a particular track group. The syntax of the TrackGroupEntryBox is determined by track_group_entry_type. TrackGroupEntryBox is mapped to the track group by a unique track_group_entry_type that is associated with a track_group_type defined in subclause 8.3.4.3. More than one TrackGroupEntryBox with the same track_group_entry_type may be present in TrackGroupDescriptionBox, in that case TrackGroupEntryBoxes shall have different track_group_id.

8.3.5.2 Syntax

```
aligned(8) class TrackGroupDescriptionBox extends Box('tkgd')
{
   Box boxes[ ];
}
aligned(8) abstract class TrackGroupEntryBox (unsigned int(32) track_group_entry_type, unsigned int(8) version,
unsigned int(24) flags) extends FullBox(track_group_entry_type, version, flags)
{
   unsigned int(32) track_group_id;
   // the remaining data may be specified
   // for a particular track_group_entry_type
}
```

8.5.5.5 Semantics

The TrackGroupDescriptionBox contains TrackGroupEntryBoxes.

track_group_entry_type indicates a four character code (4CC) that is associated with a track_group_type. The pair of track_group_id and track_group_entry_type identifies the track group that the TrackGroupEntryBox describes.

8.3.5.4 Track Group Entry Definitions 8.3.5.4.1 Preselection Track Group Entry Box 8.3.5.4.1.1 Definition Box Type: 'prse'

Container: TrackGroupDescriptionBox

Mandatory: No

Quantity: Zero or More

Preselections can be qualified, for example, by language, kind or media specific attributes like audio rendering indications, audio interactivity or channel layouts. Attributes signalled in a PreselectionTrackGroupEntryBox take precedence over attributes signalled in contributing tracks.

Preselection TrackGroupEntryBox shall describe only track groups identified by track_group_type equal to 'prse'.

All preselections with at least one contributing track having the track_in_movie flag set to 1 shall be qualified by PreselectionTrackGroupEntryBoxes. Otherwise, the presence of the Preselection TrackGroupEntryBoxes is optional.

All attributes uniquely qualifying a preselection shall be present in PreselectionTrackGroupEntryBox of the preselection.

8.3.5.4.1.2 Syntax

```
aligned(8) class PreselectionTrackGroupEntryBox
     extends TrackGroupEntryBox('prse', version=0, flags)
{
   unsigned int(8) num_tracks;
   utf8string preselection_tag;
   if (flags & 1) {
      unsigned int(8) selection_priority;
   }
   if (flags & 2) {
      unsigned int(8)   segment_order;
   }
   // Boxes describing the preselection
}
```

8.3.5.4.1.3 Semantics

This box contains information on what experience is available when this preselection is selected.

Boxes suitable to describe a preselection include but are not limited to the following list of boxes defined in this document:

AudioElementBox (subclause 12.2.9)
AudioElementSelectionBox (subclause 12.2.13)
ExtendedLanguageBox (subclause 8.4.6)
UserDataBox (subclause 8.10.1)
KindBox (subclause 8.10.4)
LabelBox (subclause 8.10.5)
AudioRenderingIndicationBox (subclause 12.2.8)
ChannelLayout (subclause 12.2.4)

If a UserDataBox is contained in a PreselectionTrackGroupEntryBox, then it shall not carry any of the above boxes.

num_tracks specifies the number of non-alternative tracks grouped by this preselection track group.

A track grouped by this preselection track group is a track that has the 'pres' track group with track_group_id equal to the ID of this preselection.

The number of non-alternative tracks grouped by this preselection track group is the sum of the following:

the number of tracks that have alternate_group equal to 0 and are grouped by this preselection track group, the number of unique non-zero alternate_group values in all tracks that are grouped by this preselection track group.

The value of num_tracks shall be greater than or equal to the number of non-alternative tracks grouped by this preselection track group in this file. A value equal to 0 indicates that the number of tracks grouped by this track group is unknown or not essential for processing the track group.

NOTE 1. The value of num_tracks can be greater than the number of non-alternative tracks containing a PreselectionGroupBox with the same track_group_id in this file when the preselection is split into multiple files.

NOTE 4. The kind box might utilize the Role scheme defined in ISO/IEC 23009-1:2022, subclause 5.8.5.5 as it provides a commonly used scheme to describe characteristics of preselections.

NOTE 5. This box carries information about the initial experience of the preselection in the referenced tracks. The preselection experience can change during the playback of these tracks, e.g., audio language can change during playback. These changes are not subject to the information presented in this box.

Further media type specific boxes may be used to describe properties of the preselection. Readers may ignore and skip boxes that are not recognized.

8.3.4.4.4 Preselection Track Group Entry Box 8.3.4.4.4.1 Definition

Box Type: 'prse'

Container: TrackGroupDescriptionBox

Mandatory: No

Quantity: Zero or More

Preselections can be qualified, for example, by language, kind or media specific attributes like audio rendering indications, object interactivity or channel layouts. Attributes signalled in a PreselectionTrackGroupEntryBox shall take precedence over attributes signalled in contributing tracks. Preselection TrackGroupEntryBox shall described only track groups identified by track_group_type equal to 'pres'. All attributes uniquely qualifying a preselection shall be present in PreselectionTrackGroupEntryBox of the preselection.

8.3.4.4.4.2 Syntax

```
aligned(8) class PreselectionTrackGroupEntryBox (track__group__entry__type = 'prse', version = 0, flags)
    extends TrackGroupEntryBox(track__group__entry__type, version, flags)
{
  if (flags & 1) {
    unsigned int(8) selection__priority=1;
  }
  PreselectionInformationBox presel__info;
  PreselectionProcessingBox presel__processing;
}
```

NOTE 2. When a player has access to fewer non-alternative tracks grouped by this preselection track group than indicated by num_tracks, the player might need to omit the tracks grouped by this preselection track group.

preselection_tag is a codec specific value that a playback system can provide to a decoder to uniquely identify one out of several preselections in the media.

selection_priority is an integer that declares the priority of the preselection in cases where no other differentiation such as through the media language is possible. A lower number indicates a higher priority.

segment_order specifies, if present, an order rule of segments that is suggested to be followed for ordering received segments of the Preselection. The following values are specified with semantics according to ISO/IEC 23009-1:2022, subclause 5.3.11.5:

0: undefined
1: time-ordered
2: fully-ordered

Other values are reserved. If segment_order is not present, its value shall be inferred to be equal to 0.

NOTE 3. Not all tracks contributing to the playout of a preselection may be delivered in the same file.

8.3.4.4.4.3 Semantics selection_priority is an integer that declares the priority of the preselection in cases where no other differentiation such as through the media language is possible. A lower number indicates a higher priority. presel_info is an instance of the PreselectionInformationBox, providing information that describes the preselection. presel_processing is an instance of the PreselectionProcessingBox, providing information needed for processing the preselection.

8.3.4.4.5 Preselection Information Box 8.3.4.4.5.1 Definition

Box Type: 'prsi'

Container: PreselectionGroupBox

Mandatory: No

Quantity: Zero or One

This Box aggregates all semantic information about the preselection.

8.3.4.4.5.2 Syntax

```
aligned(8) class PreselectionInformationBox
  extends FullBox('prsi', version=0, 0 ){
```

-continued

```
        unsigned int(8) numTracks;
        // Boxes describing the preselection
    }
```

8.3.4.4.5.3 Semantics

This box contains information on what experience is available when this preselection is selected. Boxes suitable to describe a preselection include but are not limited to the following list of boxes defined in this specification:

The audio object box (clause 8.3.4.4.5)

The audio object selection box (clause 8.3.4.4.7)

The extended language tag (clause 8.4.6)

The user data box (clause 8.10.1)

The track kind (clause 8.10.4)

The label box (clause 8.18.4)

The audio rendering indication (clause 8.18.5)

The channel layout (clause 12.2.4.1)

If the user data box is contained in a PreselectionBox, then it shall not carry any of the above boxes. numTracks declares how many tracks are contributing to the playout of the preselection. This value shall match the number of tracks containing a PreselectionGroupBox with the same track_group_id. Note 1: not all tracks contributing to the playout of a preselection may be delivered in the same file. Note 2: The kind box might utilize the Role scheme defined in ISO/IEC 23009-1, clause 5.8.5.5 as it provides a commonly used scheme to describe characteristics of preselections. Further media type specific boxes may be used to describe properties of the preselection.

. . . .

8.3.4.4.10 Preselection Processing Box 8.3.4.4.10.1 Definition

Box Type: 'prsp'

Container: PreselectionGroupBox

Mandatory: Yes

Quantity: Exactly One

This box contains information how the tracks contributing to the preselection shall be processed. Media type specific boxes may be used to describe further processing.

8.3.4.4.10.2 Syntax

```
aligned(8) class PreselectionProcessingBox
    extends FullBox('prsp', version=0, flags ){
    utf8string preselection_tag;
    if (flags & 1) {
        unsigned int(8)    order=0;
    }
    unsigned int(8) track_order;
    unsigned int(1) sample_merge_flag;
    unsigned int(7) reserved;
    // further attributes and Boxes defining additional processing of
    // the track contributing to the preselection
}
```

8.3.4.4.10.3 Semantics preselection_tag is a codec specific value that a playback system can provide to a decoder to uniquely identify one out of several preselections in the media. order specifies the conformance rules for Representations in Adaptation Sets within the Preselection according to ISO/IEC 23009-1, from the following enumerated set:

0: undefined

1: time-ordered

2: fully-ordered track_order defines the order of this track for the merging process described below. sample_merge_flag equal to 1 indicates that this track is enabled to be merged with another track as described below. Tracks contributing to a selected preselection and having the sample_merge_flag equal to 1 shall merge their samples according to the respective media type. If the media type does not specify such a process, contributing samples may be appended to the samples of the track with the next lower track_order. If the generated output samples from this merging process shall be embedded into a new track, this track shall be conformant to a media type derived from the base media type. Note: for MPEG high efficiency (MPEG-H) three dimensional (3D) Audio, this process is defined in ISO/IEC 23008-3, clause 14.6.

. . . .

3. TECHNICAL PROBLEMS SOLVED BY DISCLOSED TECHNICAL SOLUTIONS

Example designs for preselections signalling in the ISOBMFF have the following problems:

First, a DASH Adaptation Set in the ISOBMFF maps to an alternate group. A DASH Preselection comprises Adaptation Sets. Although signalled through track grouping, an ISOBMFF preselection should comprise alternate groups. In other words, an ISOBMFF preselection track group should not group more than one track of any particular alternate group. However, currently, this is allowed.

Second, a DASH Preselection comprises one or more Adaptation Sets, and one of them is indicated as the Main Adaptation Set. However, there is no corresponding indication for an ISOBMFF preselection.

Third, the following is specified:

All preselections with at least one contributing track having the track_in_movie flag set to 1 shall be qualified by PreselectionTrackGroupEntryBoxes. Otherwise, the presence of the Preselection TrackGroupEntryBoxes is optional.

However, tracks contributing to a preselection may be stored in separate ISOBMFF files, therefore it is possible that a preselection in a current file has one or more tracks having the track_in_movie flag equal to 1, but those tracks are all in other files, while in the current file the tracks contributing to the preselection all have the track_in_movie flag equal to 0. In this case, the presence of the Preselection TrackGroupEntryBox in the current file for the preselection should not be required.

Fourth, the preselection_tag field in the PreselectionTrackGroupEntryBox only provides redundant information and thus should be removed. In DASH, the preselection tag is only specified for the descriptor-based preselection approach, for uniquely identifying a preselection, and it is not specified for the element-based approach, for which there is already the preselection ID as well as the characterizing parameters. In the ISOBMFF, since there is already the preselection ID, i.e., the track group ID, and the characterizing parameters, this preselection_tag field is not needed, just like in DASH for the element-based preselection approach.

Fifth, the segment_order field in the Preselection TrackGroupEntryBox is unclearly specified and it only provides redundant information, and thus should be removed. The way the specification is written in ISO/IEC 23009-1:2022, subclause 5.3.11.5 is heavily dependent on some general DASH contexts as well as on some specific details of the DASH preselection signalling, both of which are not available in the specific ISOBMFF context herein. That made the current specification of the semantics of segment_order basically impossible for ISOBMFF implementers to be able to follow. For example, merging at DASH level is segments/ subsegments based and the output is fed to the underlying ISOBMFF parser, while at ISOBMFF level merging is sample based, and the output is fed to the decoder. Furthermore, segment_order field is redundant with what the track_order field in the PreselectionProcessingBox is providing. In the file format level the data provided by the track_order field in the PreselectionProcessingBox is sufficient, in terms of needed processing order in DASH level. The corresponding processing order in file format level can already be provided by the track_order fields in the PreselectionProcessingBoxes of the tracks contributing to the preselection. This is because the decoding time based order already satisfies the so-called time-ordered requirement in DASH. Further, the track_order fields in the PreselectionProcessingBoxes of the tracks contributing to the preselection can provide the so-called fully-ordered requirement in DASH.

4. A LISTING OF SOLUTIONS AND EMBODIMENTS

To solve the above-described problem, methods as summarized below are disclosed. The inventions should be considered as examples to explain the general concepts and should not be interpreted in a narrow way. Furthermore, these inventions can be applied individually or combined in any manner.

Example 1

To solve the first problem, one or more of the following are specified:

When any two tracks belong to the same alternate group, they shall not both have a PreselectionGroupBox with the same value of track_group_id.

When processing a preselection to which a track contributes, that track can be replaced by any other track in the same alternate group that track belongs to.

Example 2

To solve the second problem, an indication of a main track for a preselection is signalled.

In one example, the indication is signalled by a field in a track contributing to the preselection.

In one example, the field is a one-bit flag.

In one example, the flag equal to 1 indicates that the track is the main track in the preselection, and the flag equal to 0 indicates that the track is not the main track in the preselection.

In one example, it is required that one and only one track among all tracks contributing to the preselection shall have the flag equal to 1.

In one example, the indication is signalled through the track_order field.

In one example, it is specified that the main track is the one with the lowest value of track_order.

In one example, it is specified that, in case there are multiple tracks contributing to the presentation having the smallest value of track_order, any of them can be used as the main track.

In one example, it is specified that, when the track_order field is not present (e.g., when the PreselectionProcessingBox is not present) for a track contributing to the preselection, the value of track_order is inferred to be equal to 0.

In one example, it is specified that, when the media content is encapsulated as a DASH Media Presentation, the Adaptation Set containing the Representation for the main track in a preselection would be the Main Adaptation Set for the DASH Preselection.

Example 3

To solve third problem, the following is specified:

For any preselection, if at least one contributing track in this file has the track_in_movie flag equal to 1, the PreselectionTrackGroupEntryBox shall be present in this file for the preselection; otherwise, the presence of the Preselection TrackGroupEntryBox for the preselection in this file is optional.

Example 4

To solve fourth problem, the preselection_tag field in the Preselection TrackGroupEntryBox is removed.

Example 5

To solve fifth problem, the segment_order field in the PreselectionTrackGroupEntryBox is removed.

5. EMBODIMENTS

Below are some example embodiments for all the disclosure items and most of their subitems summarized above in Section 4. Most relevant parts that have been added or modified are shown in underlined bold font, and some of the deleted parts are shown in italicized bold fonts. There may be some other changes that are editorial in nature and thus not noted. Parts that remain unchanged are not included.

5.1 First Embodiment

This embodiment is for items 1-5, except for some sub-items described in example 2.

. . . .

3.1 Definitions and Terms

. . . .

preselection set of one or more tracks representing one version of the media presentation content for simultaneous decoding or presentation

. . . .

8.3.4.4.3 Preselection Group Box 8.3.4.4.3.1 Definition

The presence of a TrackGroupTypeBox with track_group_type equal to 'pres', which is also referred to as a PreselectionGroupBox, in a track indicates that this track contributes to a preselection.

All the tracks that have a track group with track_group_type equal to 'pres' and a particular value of track_group_id are part of the same preselection. The particular value of track_group_id is also referred to as the ID of the preselection.

NOTE 1 This means that a preselection is uniquely identified by the track_group_id of the track group.

When any two tracks belong to the same alternate group, they shall not both have a PreselectionGroupBox with the same value of track_group_id. However, when processing a preselection to which a track contributes, that track can be replaced by any other track in the same alternate group that track belongs to.

When multiple tracks contribute to a preselection, the optionally present PreselectionProcessingBox provides information on how to process the track containing this box in the context of the preselection and relative to other tracks. Consequently, the content of the PreselectionProcessingBox may differ for each track within a preselection.

NOTE 2 Preselections consisting of only one track do not require any track-related processing. In this case, the PreselectionProcessingBox is typically not present in the PreselectionGroupBox.

8.3.4.4.3.2 Syntax

```
aligned(8) class PreselectionGroupBox extends
TrackGroupTypeBox('pres')
{
  unsigned int(1) main_track_in_preselection_flag;
  unsigned int(7) reserved;
  PreselectionProcessingBox preselection_processing;   // optional
}
```

8.3.4.4.3.3 Semantics main_track_in_preselection_flag equal to 1 indicates that the track is the main track in the preselection. main_track_in_preselection_flag equal to 0 indicates that the track is not the main track in the preselection. One and only one track among all tracks contributing to a preselection shall have main_track_in_preselection_flag equal to 1.

NOTE When the media content is encapsulated as a DASH Media Presentation, the Adaptation Set containing the Representation for the main track in a preselection would be the Main Adaptation Set for the DASH Preselection.

preselection_processing is an instance of the PreselectionProcessingBox, providing information needed for processing the containing track in the context of the preselection and relative to other tracks.

. . . .

8.3.5.4 Track Group Entry Definitions 8.3.5.4.1 Preselection Track Group Entry Box 8.3.5.4.1.1 Definition Box Type: 'prse'

Container: TrackGroupDescriptionBox

Mandatory: No

Quantity: Zero or More

Preselections can be characterized, for example, by language, kind or media specific attributes like audio rendering indications, audio interactivity or channel layouts. Attributes signalled in a PreselectionTrackGroupEntryBox take precedence over attributes signalled in contributing tracks.

Preselection TrackGroupEntryBox shall describe only track groups identified by track_group_type equal to 'prse'.

All preselections with at least one contributing track having the track_in_movie flag set to 1 shall be qualified by Preselection TrackGroupEntryBoxes. Otherwise, the presence of the Preselection TrackGroupEntryBoxes is optional.

For any preselection, if at least one contributing track in this file has the track_in_movie flag equal to 1, the PreselectionTrackGroupEntryBox shall be present in this file for the preselection; otherwise, the presence of the PreselectionTrackGroupEntryBox for the preselection in this file is optional.

All attributes uniquely characterizing a preselection shall be present in the Preselection TrackGroupEntryBox for the preselection.

8.3.5.4.1.2 Syntax

```
aligned(8) class PreselectionTrackGroupEntryBox
    extends TrackGroupEntryBox('prse', version=0, flags)
{
  unsigned int(8) num_tracks;
  utf8string preselection_tag;
  if (flags & 1) {
    unsigned int(8) selection_priority;
  }
  if (flags & 2) {
    unsigned int(8) segment_order;
  }
  // Boxes describing the preselection
}
```

8.3.5.4.1.3 Semantics

This box contains information on what experience is available when this preselection is selected.

Boxes suitable to describe a preselection include but are not limited to the following list of boxes defined in this document:

AudioElementBox (subclause 12.2.9)
AudioElementSelectionBox (subclause 12.2.13)
ExtendedLanguageBox (subclause 8.4.6)
UserDataBox (subclause 8.10.1)
KindBox (subclause 8.10.4)
LabelBox (subclause 8.10.5)
AudioRenderingIndicationBox (subclause 12.2.8)
ChannelLayout (subclause 12.2.4)

If a UserDataBox is contained in a PreselectionTrackGroupEntryBox, then it shall not carry any of the above boxes.

When contained in a Preselection TrackGroupEntryBox, a UserDataBox shall not carry any of the above boxes.

num_tracks specifies the number of non-alternative tracks grouped by this preselection track group.

A track grouped by this preselection track group is a track that has the 'pres' track group with track_group_id equal to the ID of this preselection.

The number of non-alternative tracks grouped by this preselection track group is the sum of the following:

- the number of tracks that have alternate_group equal to 0 and are grouped by this preselection track group,
- the number of unique non-zero alternate_group values in all tracks that are grouped by this preselection track group.

The value of num_tracks shall be greater than or equal to the number of non-alternative tracks grouped by this this preselection track group in file.

A value equal to 0 indicates that the number of tracks grouped by this track group is unknown or not essential for processing the track group.

NOTE 1 The value of num_tracks can be greater than the number of non-alternative tracks containing a PreselectionGroupBox with the same track_group_id in this file when the preselection is split into multiple files.

NOTE 2 When a player has access to fewer non-alternative tracks grouped by this preselection track group than indicated by num_tracks, the player might need to omit the tracks grouped by this preselection track group.

preselection_tag is a codec specific value that a playback system can provide to a decoder to uniquely identify one out of several preselections in the media.

selection_priority is an integer that declares the priority of the preselection in cases where no other differentiation such as through the media language is possible. A lower value of selection_priority indicates a higher priority.

segment_order specifies, if present, an order rule of segments that is suggested to be followed for ordering received segments of the Preselection. The following values are specified with semantics according to ISO/IEC 23009-1:2022, subclause 5.3.11.5:

0: undefined

1: time-ordered

2: fully-ordered

Other values are reserved. If segment_order is not present, its value shall be inferred to be equal to 0.

NOTE 3 Not all tracks contributing to the playout of a preselection may be delivered in the same file.

NOTE 4 The kind box might utilize the Role scheme defined in ISO/IEC 23009-1:2022, subclause 5.8.5.5 as it provides a commonly used scheme to describe characteristics of preselections.

NOTE 5 This box carries information about the initial experience of the preselection in the referenced tracks. The preselection experience can change during the playback of these tracks, e.g., audio language can change during playback. These changes are not subject to the information presented in this box.

Further media type specific boxes may be used to describe properties of the preselection. Readers may ignore and skip boxes that are not recognized.

. . . .

6. REFERENCES

[1] ITU-T and ISO/IEC, "High efficiency video coding", Rec. ITU-T H.265 | ISO/IEC 23008-2 (in force edition).

[2] Rec. ITU-T H.266 | ISO/IEC 23090-3, "Versatile Video Coding".

[3] Rec. ITU-T Rec. H.274 | ISO/IEC 23002-7, "Versatile Supplemental Enhancement Information Messages for Coded Video Bitstreams".

[4] ISO/IEC 14496-12: "Information technology—Coding of audio-visual objects—Part 12: ISO base media file format".

[5] ISO/IEC 23009-1: "Information technology—Dynamic adaptive streaming over HTTP (DASH)—Part 1: Media presentation description and segment formats".

[6] ISO/IEC 14496-15: "Information technology—Coding of audio-visual objects—Part 15: Carriage of network abstraction layer (NAL) unit structured video in the ISO base media file format".

[7] ISO/IEC 23008-12: "Information technology—High efficiency coding and media delivery in heterogeneous environments—Part 12: Image File Format".

[8] ISO/IEC JTC 1/SC 29/WG 03 output document N0651, "Text of ISO/IEC DIS 14496-12 8th edition ISO Base Media File Format", September 2022.

FIG. 1 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
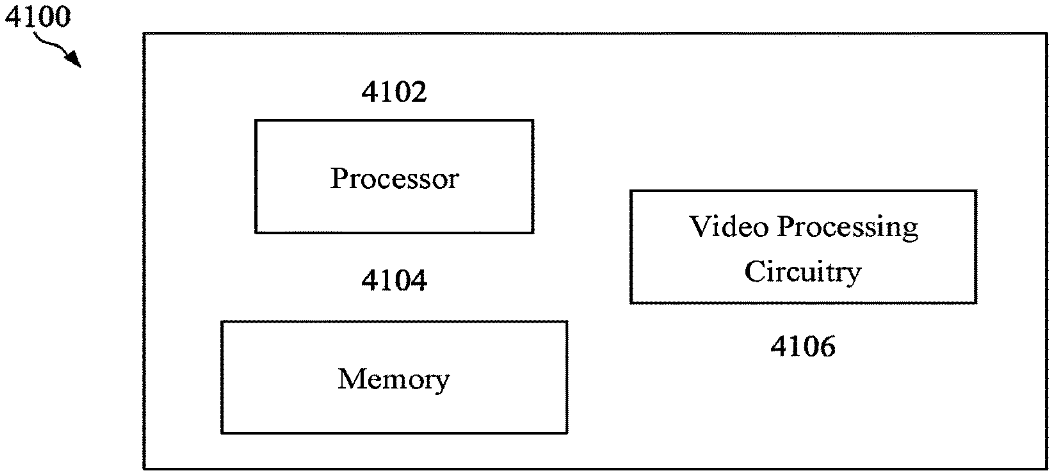
FIG. 2 is a block diagram of an example video processing apparatus.

FIG. 2 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

Figure 3:
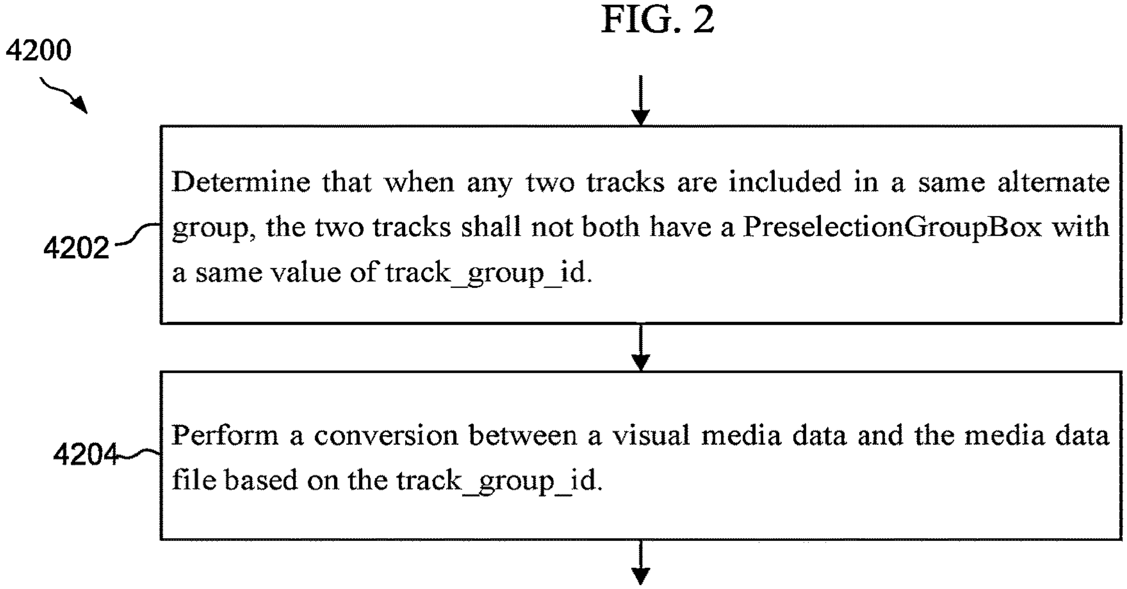
FIG. 3 is a flowchart for an example method of video processing.

FIG. 3 is a flowchart for an example method 4200 of video processing. The method 4200 includes determining that when any two tracks are included in a same alternate group, the two tracks shall not both have a PreselectionGroupBox with a same value of track_group_id at step 4202. A conversion is performed between a visual media data and the media data file based on the track_group_id at step 4204. The conversion of step 4204 may include encoding at an encoder or decoding at a decoder, depending on the example.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 4:
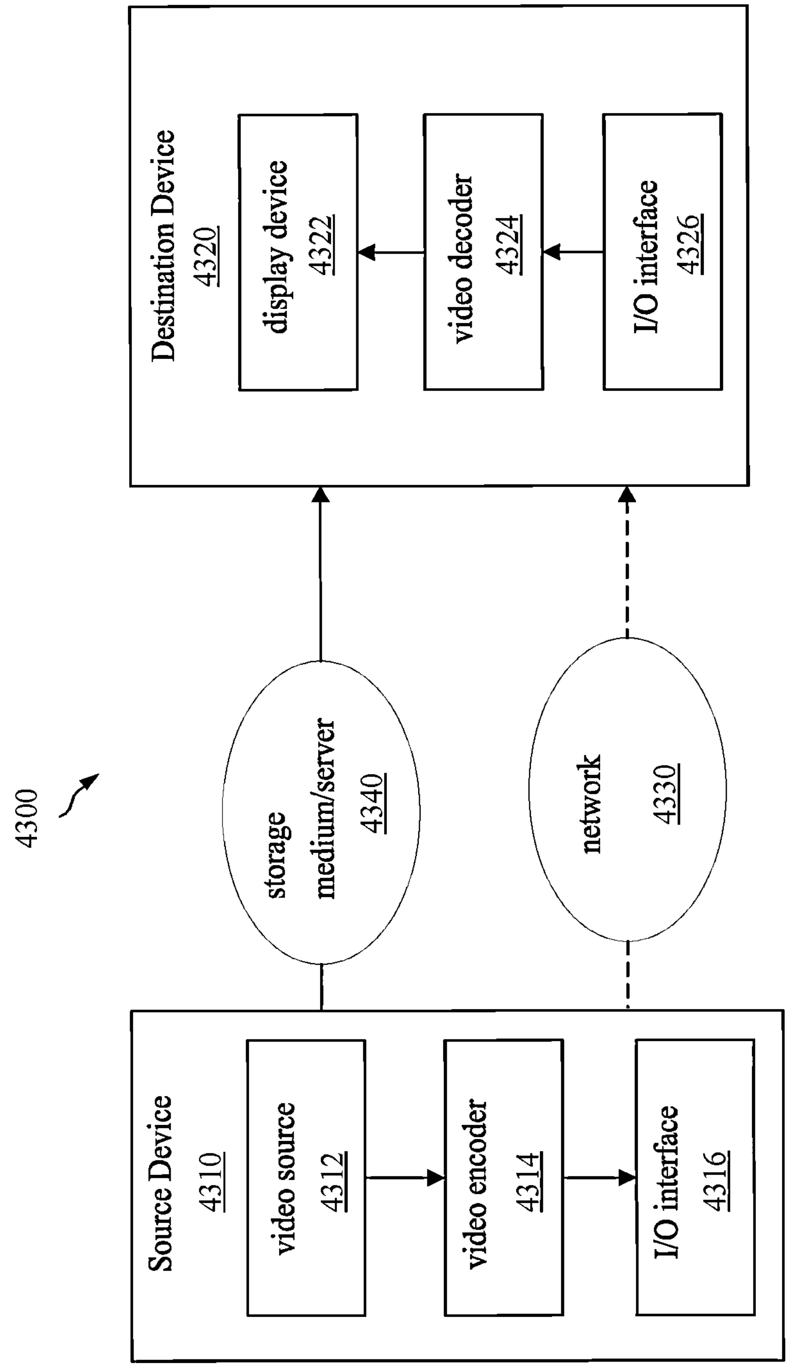
FIG. 4 is a block diagram that illustrates an example video coding system.

FIG. 4 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 5:
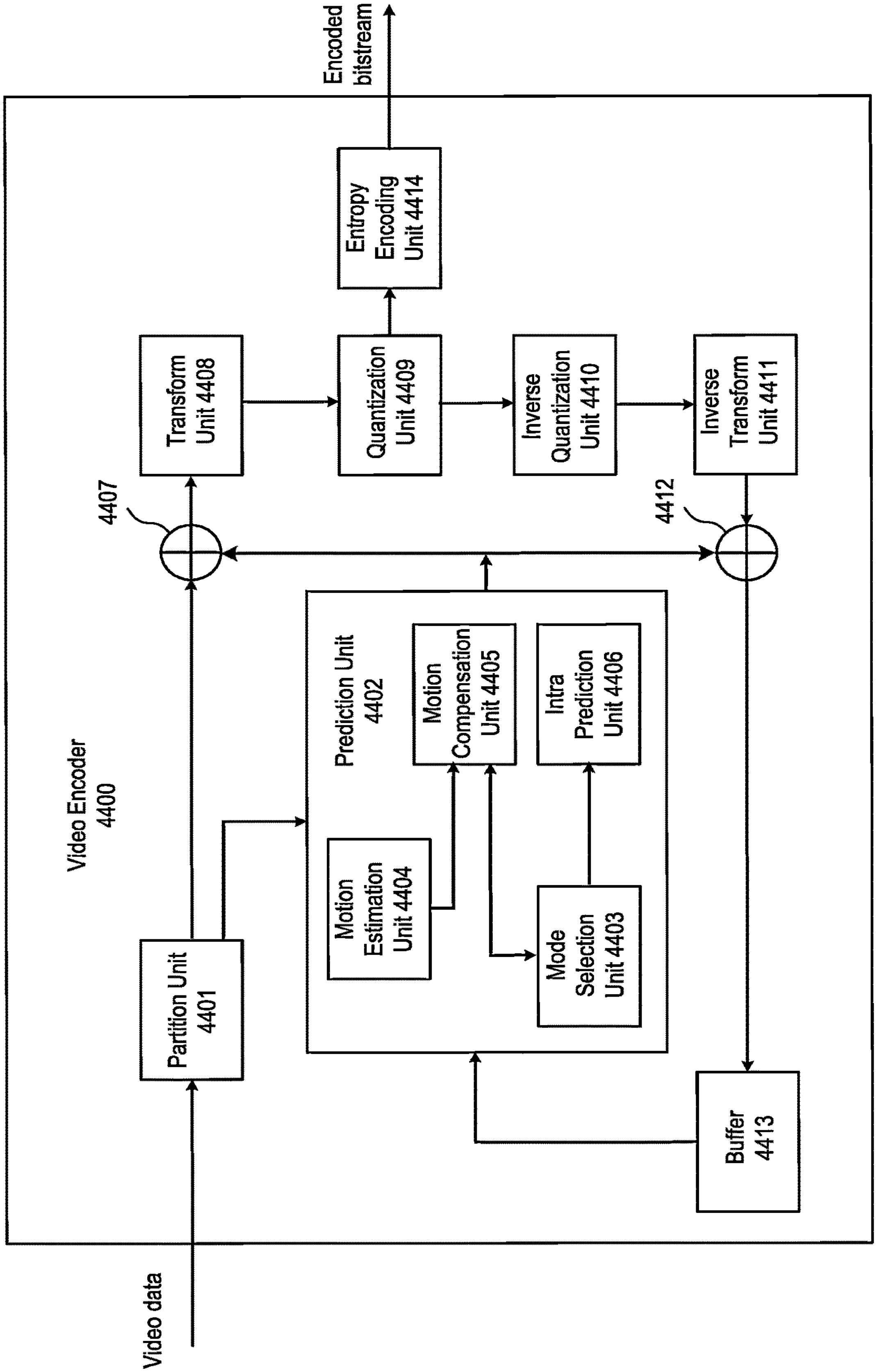
FIG. 5 is a block diagram that illustrates an example encoder.

FIG. 5 is a block diagram illustrating an example of video encoder 4400, which may be video encoder 4314 in the system 4300 illustrated in FIG. 4. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 6:
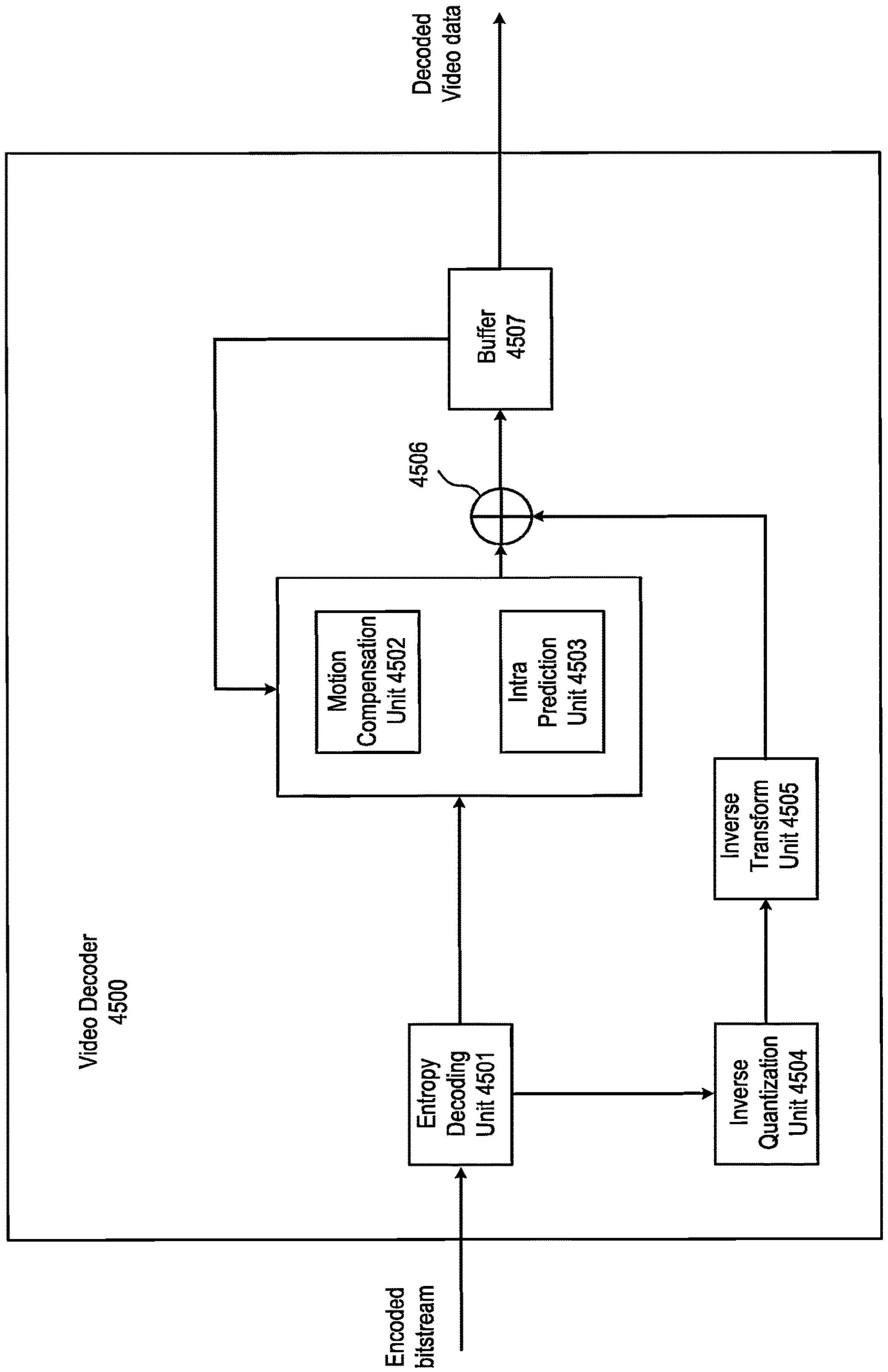
FIG. 6 is a block diagram that illustrates an example decoder.

FIG. 6 is a block diagram illustrating an example of video decoder 4500 which may be video decoder 4324 in the system 4300 illustrated in FIG. 4. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 7:
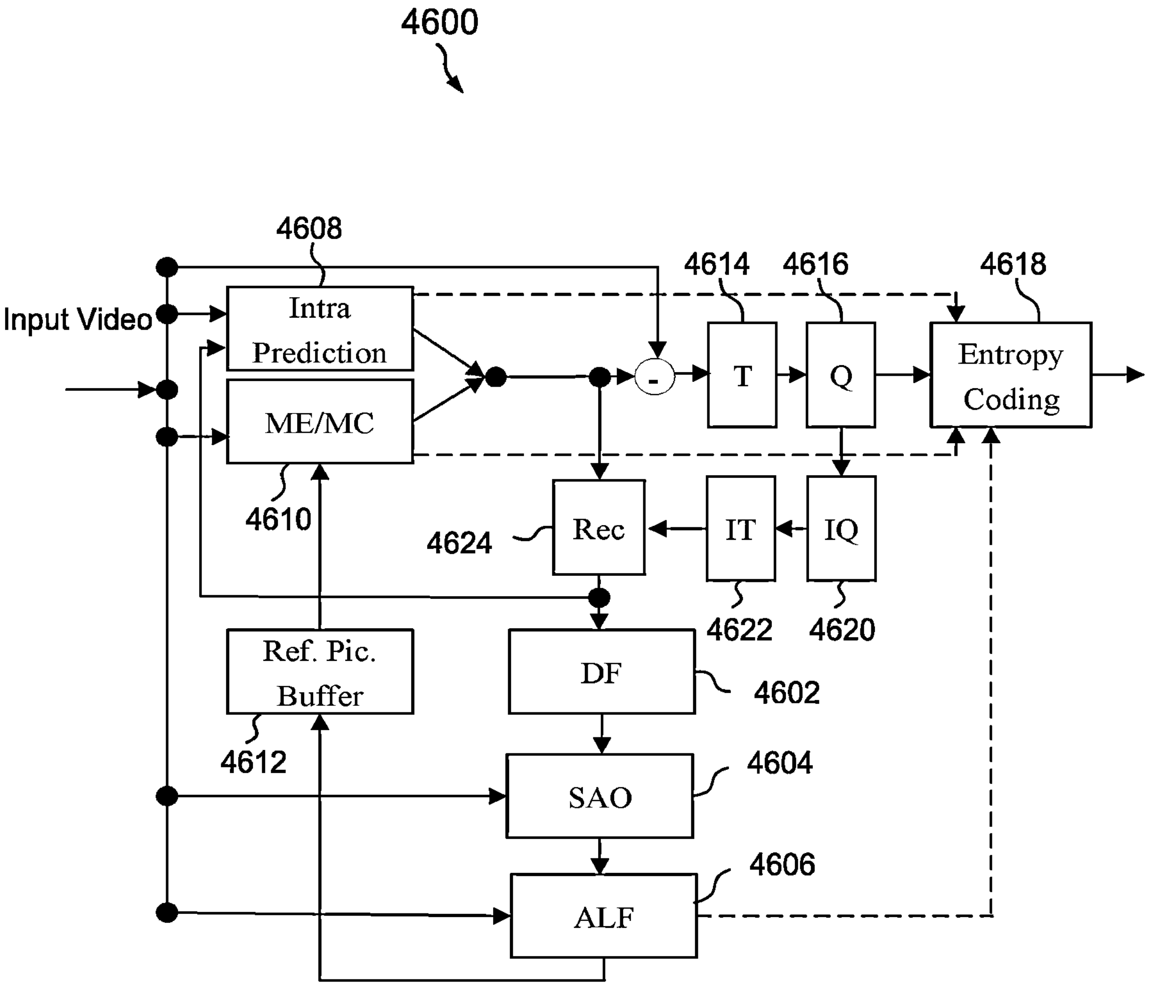
FIG. 7 is a schematic diagram of an example encoder.

FIG. 7 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

Figure 8:
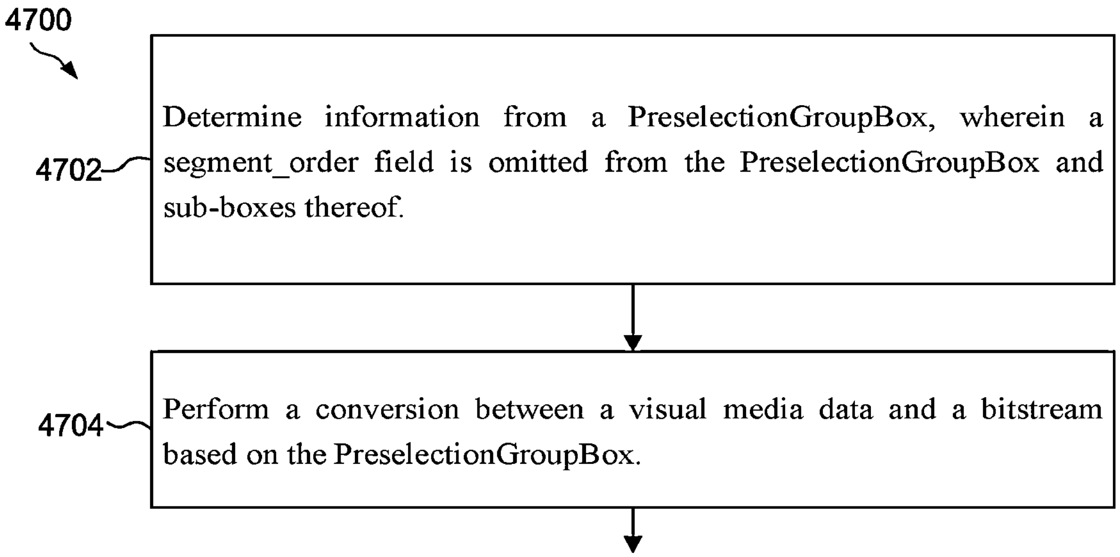
FIG. 8 is a flowchart for an example method of video processing.

FIG. 8 is a flowchart for an example method 4700 of video processing. The method 4700 includes determining information from a PreselectionGroupBox at step 4702. A segment_order field is omitted from the PreselectionGroupBox and sub-boxes thereof. A conversion is performed between a visual media data and a bitstream based on the PreselectionGroupBox at step 4704.

It should be noted that the method 4700 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4700 can be performed by a non-transitory computer readable medium comprising a computer program product for use by a video coding device. The computer program product comprises computer executable instructions stored on the non-transitory computer readable medium such that when executed by a processor cause the video coding device to perform the method 4700.

A listing of solutions preferred by some examples is provided next.

The following solutions show examples of techniques discussed herein.

1. A method for processing video data comprising: determining that when any two tracks are included in a same alternate group, the two tracks shall not both have a PreselectionGroupBox with a same value of track_group_id; and performing a conversion between a visual media data and the media data file based on the track_group_id.
2. The method of solution 1, wherein when processing a preselection to which a track contributes, that track can be replaced by any other track in a same alternate group including the track.
3. The method of any of solutions 1-2, wherein an indication of a main track for a preselection is signalled.
4. The method of any of solutions 1-3, the indication is signaled by a field in a track contributing to the preselection.
5. The method of any of solutions 1-4, wherein the field is a one-bit flag.
6. The method of any of solutions 1-5, wherein the flag equal to 1 indicates that the track is the main track in the preselection, and wherein the flag equal to 0 indicates that the track is not the main track in the preselection.
7. The method of any of solutions 1-6, wherein a rule requires that one and only one track among all tracks contributing to the preselection shall have a flag equal to 1.
8. The method of any of solutions 1-7, wherein the indication is signalled through the track_order field.
9. The method of any of solutions 1-8, wherein the main track has a lowest value of track_order.
10. The method of any of solutions 1-9, wherein when multiple tracks contribute to a presentation having the smallest value of track_order, a main track can be any of the multiple tracks.
11. The method of any of solutions 1-10, wherein when a track_order field is not present for a track contributing to a preselection, the value of track_order is inferred to be equal to 0.
12. The method of any of solutions 1-11, wherein when media content is encapsulated as a dynamic adaptive streaming over hypertext transfer protocol (DASH) media presentation, an adaptation set containing a representation for a main track in a preselection is a main adaptation set for the DASH media preselection.
13. The method of any of solutions 1-12, wherein for any preselection, when at least one contributing track has a track_in_movie flag equal to 1, a PreselectionTrackGroupEntryBox shall be present for the preselection, and wherein a presence of the PreselectionTrackGroupEntryBox for the preselection is otherwise optional.

14. The method of any of solutions 1-13, wherein a preselection_tag field is not present in a Preselection TrackGroupEntryBox.
15. The method of any of solutions 1-14, wherein a segment_order field is not present in a Preselection TrackGroupEntryBox.
16. An apparatus for processing video data comprising: a processor; and a non-transitory memory with instructions thereon, wherein the instructions upon execution by the processor, cause the processor to perform the method of any of solutions 1-15.
17. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-15.
18. A non-transitory computer-readable recording medium storing a bitstream of a video which is generated by a method performed by a video processing apparatus, wherein the method comprises: determining that when any two tracks are included in a same alternate group, the two tracks shall not both have a PreselectionGroupBox with a same value of track_group_id; and generating a bitstream based on the determining.
19. A method for storing bitstream of a video comprising: determining that when any two tracks are included in a same alternate group, the two tracks shall not both have a PreselectionGroupBox with a same value of track_group_id; generating a bitstream based on the determining; and storing the bitstream in a non-transitory computer-readable recording medium.
20. A method, apparatus or system described in the present document.

The following solutions show further examples of techniques discussed herein.

1. A method for processing video data comprising: determining information from a PreselectionGroupBox, wherein a segment_order field is omitted from the PreselectionGroupBox and sub-boxes thereof; and performing a conversion between a visual media data and the media data file based on the PreselectionGroupBox.
2. The method of solution 1, wherein when any two tracks are included in a same alternate group, the two tracks shall not both have a PreselectionGroupBox with a same value of track_group_id.
3. The method of any of solutions 1-2, wherein when processing a preselection to which a track contributes, the track can be replaced by another track in a same alternate group including the track.
4. The method of any of solutions 1-3, wherein an indication of a main track for a preselection is signalled.
5. The method of any of solutions 1-4, wherein the indication is signaled by a field in a track contributing to the preselection.
6. The method of any of solutions 1-5, wherein the field is a one-bit flag.
7. The method of any of solutions 1-6, wherein the flag equal to 1 indicates that the track is the main track in the preselection, and wherein the flag equal to 0 indicates that the track is not the main track in the preselection.
8. The method of any of solutions 1-7, wherein one and only one track among all tracks contributing to the preselection shall have a flag equal to 1.
9. The method of any of solutions 1-8, wherein the indication is signalled through the track_order field.
10. The method of any of solutions 1-9, wherein the main track has a lowest value of track_order.
11. The method of any of solutions 1-10, wherein when multiple tracks contribute to a presentation having a smallest value of track_order, any of the multiple tracks can be a main track.
12. The method of any of solutions 1-11, wherein when a track_order field is not present for a track contributing to a preselection, a value of track_order is inferred to be equal to 0.
13 The method of any of solutions 1-12, wherein when media content is encapsulated as a dynamic adaptive streaming over hypertext transfer protocol (DASH) media presentation, an adaptation set containing a representation for a main track in a preselection is a main adaptation set for a DASH media preselection.
14. The method of any of solutions 1-13, wherein for any preselection, when at least one contributing track in a file has a track_in_movie flag equal to 1, a Preselection TrackGroupEntryBox shall be present in the file for the preselection, and wherein a presence of the PreselectionTrackGroupEntryBox for the preselection is otherwise optional.
15. The method of any of solutions 1-14, wherein a preselection_tag field is not present in a Preselection TrackGroupEntryBox.
16. The method of any of solutions 1-15, wherein the conversion includes encoding the visual media data into the visual media data file.
17. The method of any of solutions 1-15, wherein the conversion includes decoding the visual media data from the visual media data file.
18. An apparatus for processing video data comprising: a processor; and a non-transitory memory with instructions thereon, wherein the instructions upon execution by the processor, cause the processor to perform the method of any of solutions 1-17.
19. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-17.
20. A non-transitory computer-readable recording medium storing a bitstream of a video which is generated by a method performed by a video processing apparatus, wherein the method comprises: determining information from a PreselectionGroupBox, wherein a segment_order field is omitted from the PreselectionGroupBox and sub-boxes thereof; and generating a bitstream based on the determining.
21. A method for storing bitstream of a video comprising: determining information from a PreselectionGroupBox, wherein a segment_order field is omitted from the PreselectionGroupBox and sub-boxes thereof; generating a bitstream based on the determining; and storing the bitstream in a non-transitory computer-readable recording medium.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing media data, comprising:

performing a conversion between the media data and a media data file according to a format rule, wherein the format rule specifies that a field indicating an order rule of segments is omitted from a preselection track group entry box for describing a preselection; and wherein the preselection track group entry box shall describe only track groups identified by a track group type equal to 'prse'.

2. The method of claim 1, wherein attributes signalled in the preselection track group entry box take precedence over attributes signalled in contributing tracks.

3. The method of claim 1, wherein the format rule further specifies that for any preselection, if at least one contributing track in a file has a flag equal to 1, the preselection track group entry box shall be present in the file for the preselection; otherwise, a presence of the preselection track group entry box for the preselection in the file is optional.

4. The method of claim 3, wherein the flag is a track_in_movie flag.

5. The method of claim 1, wherein the format rule further specifies that all attributes uniquely characterizing the preselection should be present in the preselection track group entry box for the preselection.

6. The method of claim 1, wherein the format rule further specifies that a presence of a track group type box with a track group type equal to 'pres' in a track indicates that the track contributes to a preselection.

7. The method of claim 1, wherein the format rule further specifies that all tracks that have a track group with a track group type equal to 'pres' and a particular value of a track group identifier are part of a same preselection.

8. The method of claim 7, wherein the particular value of the track group identifier is referred to as an identifier of the preselection.

9. The method of claim 1, wherein the format rule further specifies that when multiple tracks contribute to the preselection, an optionally present preselection processing box provides information on how to process a track containing the preselection processing box in a context of the preselection and relative to other tracks.

10. The method of claim 1, wherein the preselection is a set of one or more tracks representing one version of media presentation for simultaneous decoding or presentation.

11. The method of claim 1, wherein the conversion includes generating the media data file from the media data.

12. The method of claim 1, wherein the conversion includes parsing the media data from the media data file.

13. An apparatus for processing media data comprising: a processor; and a non-transitory memory with instructions thereon, wherein the instructions upon execution by the processor, cause the processor to:

perform a conversion between the media data and a media data file according to a format rule, wherein the format rule specifies that a field indicating an order rule of segments is omitted from a preselection track group entry box for describing a preselection; and wherein the preselection track group entry box shall describe only track groups identified by a track group type equal to 'prse'.

14. The apparatus of claim 13, wherein attributes signalled in the preselection track group entry box take precedence over attributes signalled in contributing tracks.

15. The apparatus of claim 13, wherein the format rule further specifies that for any preselection, if at least one contributing track in a file has a flag equal to 1, the preselection track group entry box shall be present in the file for the preselection; otherwise, a presence of the preselection track group entry box for the preselection in the file is optional.

16. A non-transitory computer readable storage medium storing instructions that cause a processor to:

perform a conversion between media data and a media data file according to a format rule, wherein the format rule specifies that a field indicating an order rule of segments is omitted from a preselection track group entry box for describing a preselection; and wherein the preselection track group entry box shall describe only track groups identified by a track group type equal to 'prse'.

17. The non-transitory computer readable storage medium of claim 16, wherein the format rule further specifies that for any preselection, if at least one contributing track in a file has a flag equal to 1, the preselection track group entry box shall be present in the file for the preselection; otherwise, a presence of the preselection track group entry box for the preselection in the file is optional.

18. The non-transitory computer readable storage medium of claim 16, wherein attributes signalled in the preselection track group entry box take precedence over attributes signalled in contributing tracks.

19. A non-transitory computer-readable recording medium storing a media data file which is generated by a method performed by a video processing apparatus, wherein the method comprises:

generating the media data file according to a format rule, wherein the format rule specifies that a field indicating an order rule of segments is omitted from a preselection track group entry box for describing a preselection; and wherein the preselection track group entry box shall describe only track groups identified by a track group type equal to 'prse'.

20. The non-transitory computer-readable recording medium of claim 19, wherein attributes signalled in the preselection track group entry box take precedence over attributes signalled in contributing tracks.

* * * * *